UNITED STATES PATENT OFFICE 2,594,297

4-NITRO-2,6-DI(TRIFLUOROMETHYL)-BENZENEAZO-N-FLUOROALKYL-N-HYDROXYALKYLANILINE DYE COMPOUNDS

Joseph B. Dickey, Rochester, N. Y., assignor to Eastman Kodak Company, Rochester, N. Y., a corporation of New Jersey No Drawing. Application April 1, 1949, Serial No. 85,044

7 Claims. (Cl. 260—207.5)

This invention relates to new azo compounds and their application to the art of dyeing or coloring.

I have discovered that the azo compounds having the formula:

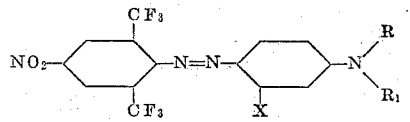

wherein R represents a —$CH_2CHF_2$, a —$CH_2CF_3$, a —$CH_2CH_2CHF_2$ or a —$CH_2CF_2CH_3$ group, $R_1$ represents a β-hydroxyethyl group, a γ-hydroxypropyl group or a β,γ-dihydroxypropyl group and X represents a hydrogen atom, a halogen atom having an atomic weight of from 19 to 80 or an alkyl hydrocarbon group having 1 to 2 carbon atoms are valuable dyes for coloring textile materials made of or containing a cellulose alkyl carboxylic acid ester having two to four carbon atoms in the acid groups thereof. They are particularly of use for the coloration of cellulose acetate textile materials. They color the aforesaid textile materials orange shades which are slightly brownish from an aqueous suspension of the dye. The dyeings thus obtained possess very good fastness to light and gas.

It is an object of my invention to provide new azo dye compounds. Another object is to provide a satisfactory process for the preparation of the new azo dye compounds of the invention. A further object is to provide dyed cellulose alkyl carboxylic acid ester textile materials which possess very good fastness to light and gas. A particular object is to provide new azo compounds which are especially of value for the dyeing of cellulose acetate textile materials.

By cellulose alkyl carboxylic acid esters having two to four carbon atoms in the acid groups thereof I mean to include, for example, both hydrolyzed and unhydrolyzed cellulose acetate, cellulose propionate, cellulose butyrate, cellulose acetate-propionate and cellulose acetate-butyrate.

The new azo dye compounds of my invention are prepared by diazotizing 4-nitro-2,6-di-(trifluoromethyl)-aniline and coupling the diazonium compound obtained with a compound having the formula:

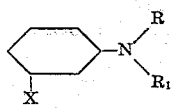

wherein R, $R_1$ and X have the meaning previously assigned to them.

The following examples illustrate the azo compounds of my invention and their manner of preparation:

EXAMPLE 1

A. Preparation of nitrosyl sulfuric acid

500 cc. of sulfuric acid (95–96%) were placed in a 5-liter flask fitted with a stirrer and thermometer and then 76 grams of commercial sodium nitrite (90–95% pure) were added with vigorous stirring. The temperature of the reaction mixture rose to 70° C.–75° C. The reaction mixture was stirred and cooled to 10° C.–14° C. Then 1200 cc. of acetic acid were added, with stirring, while maintaining the temperature of the reaction mixture below 20° C.

B. Diazotization

274 grams of 4-nitro-2,6-di-(trifluoromethyl)-aniline were added portionwise, with stirring, to the nitrosyl sulfuric acid prepared as described above and simultaneously 1 liter of cold acetic acid was added. Stirring was continued until the diazotization reaction which takes place was complete. Throughout the diazotization reaction a temperature of about 15° C. was maintained and this temperature was maintained during the coupling reaction described hereinafter.

C. Coupling

20 grams of N-β,β-difluoroethyl-N-β-hydroxyethylaniline were dissolved in 100 cc. of cold acetic acid and one tenth of the diazonium solution prepared as described above was added with stirring. The coupling reaction which takes place was completed by adding sodium carbonate until the reaction mixture was neutral to Congo Red paper, i. e., until the mineral acid (i. e. sulfuric acid) present was neutralized. A temperature of about 15° C. was maintained throughout the coupling reaction. The dye compound formed by the coupling reaction was precipitated by the addition of water, recovered by filtration, washed well with water and dried. The dye compound thus obtained has the formula:

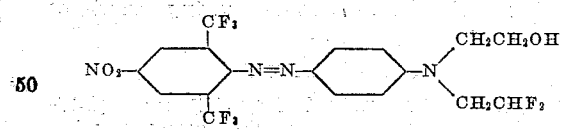

It colors cellulose acetate textile materials slightly brownish-orange shades having excellent fastness to light and gas.

EXAMPLE 2

23 grams of m-chloro-N-β,β-difluoroethyl-N-β-hydroxyethylaniline are coupled with one tenth of a diazonium solution prepared as described in Example 1. The coupling reaction and recovery of the dye compound formed is carried out exactly as described in Example 1. The dye compound obtained has the formula:

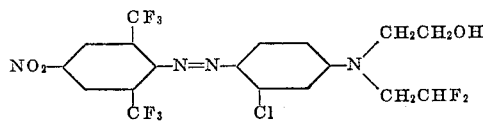

It colors cellulose acetate textile materials slightly brownish-orange shades having excellent fastness to light and gas.

EXAMPLE 3

21.4 grams of N-β,β,β-trifluoroethyl-N-β-hydroxyethylaniline are coupled with one tenth of a diazonium solution prepared as described in Example 1. The coupling reaction and recovery of the dye compound formed is carried out exactly as described in Example 1. The dye compound obtained has the formula:

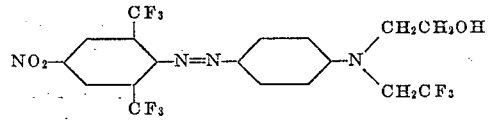

It colors cellulose acetate textile materials slightly brownish-orange shades having excellent fastness to light and gas.

EXAMPLE 4

21 grams of m-methyl-N-β,β-difluoroethyl-N-β-hydroxyethylaniline are coupled with one tenth of a diazonium solution prepared as described in Example 1. The coupling reaction and recovery of the dye compound formed is carried out exactly as described in Example 1. The dye compound obtained has the formula:

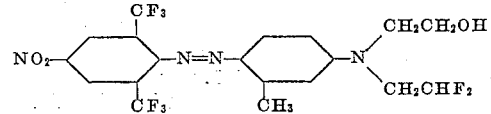

It colors cellulose acetate textile materials slightly brownish-orange shades having excellent fastness to light and gas.

EXAMPLE 5

21 grams of N-β,β-difluoroethyl-N-γ-hydroxypropylaniline are coupled with one tenth of a diazonium solution prepared as described in Example 1. The coupling reaction and recovery of the dye compound formed is carried out exactly as described in Example 1. The dye compound obtained has the formula:

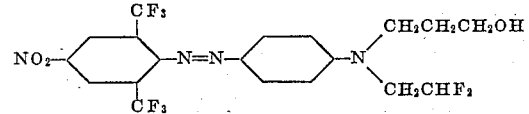

It colors cellulose acetate textile materials slightly brownish-orange shades having excellent fastness to light and gas.

EXAMPLE 6

24 grams of m-methyl-N-β,β-difluoroethyl-N-β,γ-dihydroxypropylaniline are coupled with one tenth of a diazonium solution prepared as described in Example 1. The coupling reaction and recovery of the dye compound formed is carried out exactly as described in Example 1. The dye compound obtained has the formula:

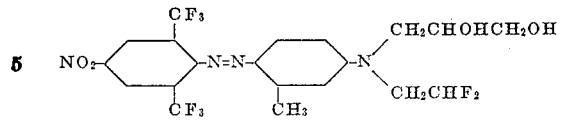

It colors cellulose acetate textile materials slightly brownish-orange shades having excellent fastness to light and gas.

EXAMPLE 7

22.8 grams of m-methyl-N-β,β,β-trifluoroethyl-N-β-hydroxyethylaniline are coupled with one tenth of a diazonium solution prepared as described in Example 1. The coupling reaction and recovery of the dye compound formed is carried out exactly as described in Example 1. The dye compound obtained has the formula:

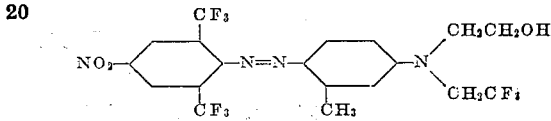

It colors cellulose acetate textile materials slightly brownish-orange shades having excellent fastness to light and gas.

EXAMPLE 8

21.4 grams of N-β,β-difluoropropyl-N-β-hydroxyethylaniline are coupled with one tenth of a diazonium solution prepared as described in Example 1. The coupling reaction and recovery of the dye compound formed is carried out exactly as described in Example 1. The dye compound obtained has the formula:

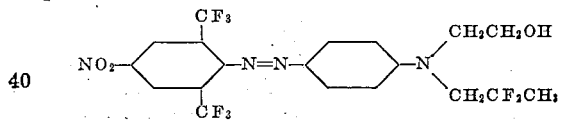

It colors cellulose acetate textile materials slightly brownish-orange shades having excellent fastness to light and gas.

EXAMPLE 9

21 grams of N-γ,γ-difluoropropyl-N-β-hydroxyethylaniline are coupled with one tenth of a diazonium solution prepared as described in Example 1. The coupling reaction and recovery of the dye compound formed is carried out exactly as described in Example 1. The dye compound obtained has the formula:

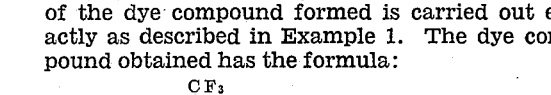

It colors cellulose acetate textile materials slightly brownish-orange shades having excellent fastness to light and gas.

EXAMPLE 10

22.6 grams of N-β,β-difluoroethyl-N-β,γ-dihydroxypropylaniline are coupled with one tenth of a diazonium solution prepared as described in Example 1. The coupling reaction and recovery of the dye compound formed is carried out exactly as described in Example 1. The dye compound obtained has the formula:

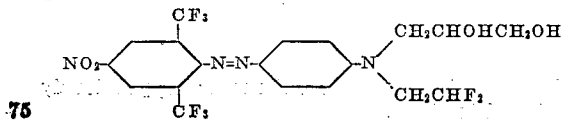

It colors cellulose acetate textile materials slightly brownish-orange shades having excellent fastness to light and gas.

EXAMPLE 11

22.8 grams of N-β,β,β-trifluoroethyl-N-γ-hydroxypropylaniline are coupled with one tenth of a diazonium solution prepared as described in Example 1. The coupling reaction and recovery of the dye compound formed is carried out exactly as described in Example 1. The dye compound obtained has the formula:

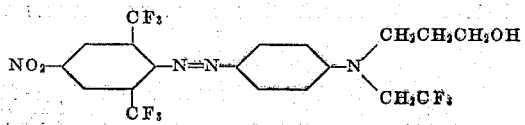

It colors cellulose acetate textile materials slightly brownish-orange shades having excellent fastness to light and gas.

By the use of 24.4 grams of N-β,β,β-trifluoroethyl - N - β,γ-dihydroxypropylaniline instead of N-β,β,β-trifluoroethyl-N-γ-hydroxypropylaniline in the example just given, a dye compound which colors cellulose acetate textile materials slightly brownish-orange shades having excellent fastness to light and gas is obtained.

EXAMPLE 12

22.4 grams of m-ethyl-N-β,β-difluoroethyl-N-β-hydroxyethylaniline are coupled with one tenth of a diazonium solution prepared as described in Example 1. The coupling reaction and recovery of the dye compound formed is carried out exactly as described in Example 1. The dye compound obtained has the formula:

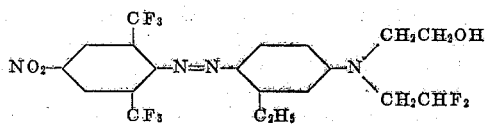

It colors cellulose acetate textile materials slightly brownish-orange shades having excellent fastness to light and gas.

By the use of 23.8 grams of m-ethyl-N-β,β-difluoroethyl-N-γ-hydroxypropylaniline instead of m-ethyl - N-β,β-difluoroethyl-N-β-hydroxyethylaniline in the example just given, a dye compound is obtained which colors cellulose acetate textile materials slightly brownish-orange shades having excellent fastness to light and gas.

EXAMPLE 13

21.3 grams of m-fluoro-N-β,β-difluoroethyl-N-β-hydroxyethylaniline are coupled with one tenth of a diazonium solution prepared as described in Example 1. The coupling reaction and recovery of the dye compound formed is carried out exactly as described in Example 1. The dye compound obtained has the formula:

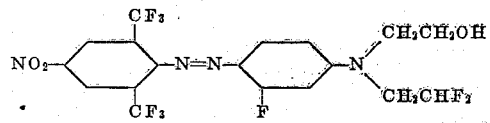

It colors cellulose acetate textile materials slightly brownish-orange shades having excellent fastness to light and gas.

By the use of 27.6 grams of m-bromo-N-β,β-difluoroethyl-N-β-hydroxyethylaniline in place of m-fluoro-N-β,β-difluoroethyl-N-β-hydroxyethylaniline in the example just given, a dye compound is obtained which colors cellulose acetate textile materials slightly brownish-orange shades having excellent fastness to light and gas.

EXAMPLE 14

24.8 grams of m-chloro-N-β,β,β-trifluoroethyl-N-β-hydroxyethylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 29.3 grams of m-bromo-N-β,β,β-trifluoroethyl-N-β-hydroxyethylaniline and 23.2 grams of m - fluoro-N-β,β,β-trifluoroethyl-N-β-hydroxyethylaniline, respectively, in place of m-chloro - N-β,β,β-trifluoroethyl - N-β-hydroxyethylaniline in the example just given, dye compounds are obtained which color cellulose acetate textile materials slightly brownish-orange shades having excellent fastness to light and gas.

EXAMPLE 15

24.2 grams of m-ethyl-N-β,β,β-difluoroethyl-N-β-hydroxyethylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 27.2 grams of m-ethyl-N-β,β,β-trifluoroethyl - N-β,γ-dihydroxypropylaniline in place of m-ethyl-N-β,β,β-trifluoroethyl-N-β-hydroxyethylaniline in the example just given, a dye compound which colors cellulose acetate textile materials slightly brownish-orange shades having excellent fastness to light and gas is obtained.

EXAMPLE 16

24 grams of N-γ,γ-difluoropropyl-N-β,γ-dihydroxypropylaniline are coupled with one tenth of a diazonium solution prepared as described in Example 1. The coupling reaction and recovery of the dye compound formed are carried out exactly as described in Example 1. The dye compound obtained has the formula:

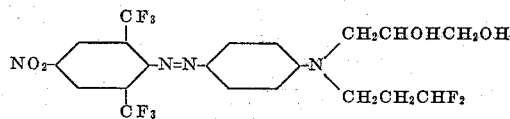

It colors cellulose acetate textile materials slightly brownish-orange shades having excellent fastness to light and gas.

By the use of 22.8 grams of N-γ,γ-difluoropropyl-N-γ-hydroxypropylaniline in place of N-γ,γ-difluoropropyl - N - β,γ - hydroxypropylaniline in the example just given, a dye compound which colors cellulose acetate textile materials slightly brownish-orange shades having excellent fastness to light and gas is obtained.

EXAMPLE 17

24.5 grams of m-chloro-N-γ,γ-difluoropropyl-N-β-hydroxyethylaniline are coupled with one tenth of a diazonium solution prepared as described in Example 1. The coupling reaction and recovery of the dye compound formed are carried out exactly as described in Example 1. The dye compound obtained colors cellulose acetate textile materials slightly brownish-orange shades having excellent fastness to light and gas.

By the use of 29 grams of m-bromo-N-γ,γ-difluoropropyl-N-β-hydroxyethylaniline and 22.9 grams of m-fluoro-N-γ,γ-difluoropropyl-N-β-hydroxyethylaniline, respectively, instead of m-chloro - N - γ,γ - difluoropropyl - N - β - hydroxyethylaniline in the example just given, dye compounds are obtained which color cellulose acetate textile materials slightly brownish-orange shades having excellent fastness to light and gas.

EXAMPLE 18

24.5 grams of m-chloro-N-β,β-difluoropropyl-N-β-hydroxyethylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 24.2 grams of m-fluoro-N-β,β-difluoropropyl - N - γ - hydroxypropylaniline and 31.9 grams of m-bromo-N-β,β-difluoropropyl - N - β,γ - dihydroxypropylaniline, respectively, instead of m-chloro-N-β,β-difluoropropyl-N-β-hydroxyethylaniline in the example just given, dye compounds are obtained which color cellulose acetate textile materials slightly brownish-orange shades having excellent fastness to light and gas.

EXAMPLE 19

22.4 grams of m-methyl-N-β,β-difluoropropyl-N-β-hydroxyethylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 23.8 grams of m-ethyl-N-β,β-difluoropropyl-N-β-hydroxyethylaniline instead of m-methyl-N-β,β-difluoropropyl-N-β-hydroxyethylaniline, a dye compound is obtained which colors cellulose acetate textile materials slightly brownish-orange shades having excellent fastness to light and gas.

EXAMPLE 20

25.2 grams of m-ethyl-N-γ,γ-difluoropropyl-N-γ-hydroxypropylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 25.4 grams of m-methyl-N-γ,γ - difluoropropyl - N - β,γ - dihydroxypropylaniline instead of m-ethyl-N-γ,γ-difluoropropyl-N-γ-hydroxypropylaniline, a dye compound which colors celluolse acetate textile materials slightly brownish-orange shades having excellent fastness to light and gas is obtained.

EXAMPLE 21

22.4 grams of N-γ,γ-difluoropropyl-N-γ-hydroxypropylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 24 grams of N-γ,γ-difluoropropyl-N-β,γ-dihydroxypropylaniline instead of N - γ,γ - difluoropropyl - N - γ - hydroxypropylaniline, a dye compound is obtained which colors cellulose acetate textile materials slightly brownish-orange shades having excellent fastness to light and gas.

EXAMPLE 22

24 grams of N-β,β-difluoropropyl-N-β,γ-dihydroxypropylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 22.4 grams of N-β,β-difluoropropyl-N-γ-hydroxypropylaniline instead of N-β,β - difluoropropyl - N - β,γ - dihydroxypropylaniline, an azo dye is obtained which colors cellulose acetate textile materials slightly brownish-orange shades having excellent fastness to light and gas.

EXAMPLE 23

24.2 grams of m-methyl-N-β,β,β-trifluoroethyl - N - γ - hydroxypropylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 27.2 grams of m-ethyl-N-β,β,β-trifluoroethyl - N - β,γ - dihydroxypropylaniline in place of m-methyl-N-β,β,β-trifluoroethyl-N-γ-hydroxypropylaniline, an azo dye is obtained which colors cellulose acetate textile materials slightly brownish-orange shades having excellent fastness to light and gas.

EXAMPLE 24

27.9 grams of m-chloro-N-β,β,β-trifluoroethyl-N-β,γ-dihydropropylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 30.7 grams of m-bromo-N-β,β,β-trifluoroethyl-N-γ-hydroxypropylaniline and 24.6 grams of m-fluoro-N-β,β,β-trifluoroethyl-N-γ-hydroxypropylaniline, respectively, instead of m-chloro- N -β,β,β-trifluoroethyl-N-β,γ-dihydropropylaniline, azo dyes are obtained which color cellulose acetate textile materials slightly brownish-orange shades having excellent fastness to light and gas.

EXAMPLE 25

24.4 grams of m-fluoro-N-β,β-difluoroethyl-N-β,γ-dihydroxypropylaniline are coupled with one tenth of a diazonium solution prepared as described in Example 1. The coupling reaction and recovery of the dye compound formed is carried out exactly as described in Example 1. The dye compound obtained colors cellulose acetate textile materials slightly brownish-orange shades having excellent fastness to light and gas.

By the use of 24.5 grams of m-chloro-N-β,β-difluoroethyl-N-γ-hydroxypropylaniline and 30.5 grams of m-bromo-N-β,β-difluoroethyl-N-β,γ-dihydroxypropylaniline, respectively, instead of m-fluoro- N -β,β-difluoroethyl-N-β,γ-dihydroxypropylaniline, azo dyes are obtained which color cellulose acetate textile materials slightly brownish-orange shades having excellent fastness to light and gas.

The acetic acid used in Example 1 was commercial acetic acid. It is essentially glacial acetic acid. In order that the preparation of the azo compounds of my invention may be entirely clear, the preparation of the intermediate compounds used in their manufacutre is disclosed hereinafter. Compounds having the formula:

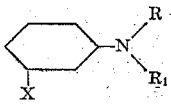

were prepared by reacting a compound having the formula:

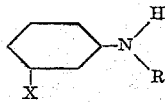

with ethylene oxide, BrCH2CH2CH2OH,

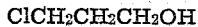

ClCH2CH2CH2OH or glycerol chlorohydrin. When ethylene oxide is used, the hydrogen atom attached to the nitrogen atom is replaced by a β-hydroxyethyl group. When BrCH2CH2CH2OH or ClCH2CH2CH2OH is used, the hydrogen atom is replaced by a γ-hydroxypropyl group and when glycerol chlorohydrin is used, the hydrogen atom is replaced by a β,γ-dihydroxypropyl group. R, R1 and X have the meanings previously assigned to them. The preparation of the above compounds will be apparent from the examples given hereinafter.

A. *Preparation of N-β,β-difluoroethyl-N-β-hydroxyethylaniline*

15.7 grams of N-β,β-difluoroethylaniline, 5.2 grams of ethylene oxide and 15 cc. of ethyl alcohol were sealed in a glass tube and heated at 200° C.–205° C. for 18 hours with shaking in an autoclave. Upon distillation of the reaction mixture under reduced pressure (about 3 mm.) through a 10″ indented column (Claisen), 18 grams (90% of theory) of N-β,β-difluoroethyl-N-β-hydroxyethylaniline boiling at 123° C.–125° C./3 mm. were obtained. About 1.5 grams of N-β,β-difluoroethylaniline was also recovered.

B. *Preparation of m-chloro-N-β,β-difluoroethyl-N-β-hydroxyethylaniline*

19.1 grams of N-β,β-difluoroethyl-m-chloroaniline and 5.06 grams of ethylene oxide were heated at 210° C. for 15 hours in a sealed glass tube. Then the reaction mixture was cooled, removed from the tube and distilled under reduced pressure (about 14 mm.). 21.4 grams (91% of theory) of m-chloro-N-β,β-difluoroethyl-N-β-hydroxyethylaniline boiling at 180° C.–182° C./14 mm. were obtained.

By the use of 17.5 grams of N-β,β-difluoroethyl-m-fluoroaniline in place of N-β,β-difluoroethyl-m-chloroaniline in the example just given, about 20.0 grams of m-fluoro-N-β,β-difluoroethyl-N-β-hydroxyethylaniline boiling at 125° C.–127° C./3 mm. are obtained.

C. *Preparation of m-methyl-N-β,β-difluoroethyl-N-β-hydroxyethylaniline*

51.5 grams of m-methyl-N-β,β-difluoroethylaniline, 15.8 grams of ethylene oxide and about 15 cc. of ethyl alcohol were sealed in a glass tube and heated, with shaking, in an autoclave containing about 150 cc. of ethyl alcohol for 15 hours at 195° C. The reaction mixture was then cooled, removed from the tube and distilled under a reduced pressure of about 1 mm. 52.5 grams of m-methyl- N -β,β-difluoroethyl- N -β-hydroxyethylaniline boiling at 112° C.–118° C./about 1 mm. were obtained. The reaction product obtained as just described was distilled under a reduced pressure of about 1 mm. on a packed column 12 inches long. A small forerun boiling at 121–123° C./about 1 mm. was obtained and then 24 grams boiling at 123° C./about 1 mm. were collected separately. This fraction consists of m-methyl-N-β,β-difluoroethyl-N-β-hydroxyethylaniline in a high state of purity.

D. *Preparation of N-β,β-difluoroethyl-N-γ-hydroxypropylaniline*

47 grams of N-difluoroethylaniline and 30.5 grams of NaHCO3 were placed in a 3-necked flask equipped with a stirrer, reflux condenser and dropping funnel and heated to 130° C.–135° C. 46.4 grams of trimethylene bromohydrin (BrCH2CH2CH2OH)

were added dropwise, with stirring, over a period of about 30 minutes and then the reaction mixture was heated, with stirring, to 140° C. for approximately 6 hours. The reaction mixture was distilled under reduced pressure (1 to 2 mm.). The fraction (9.5 grams) distilling over at 117° C.–121° C./1 to 2 mm. consists essentially of N-β,β-difluoroethyl-N-γ-hydroxypropylaniline.

| Analysis | Calculated | Found |
|---|---|---|
| C | 61.5 | 61.5 |
| H | 7.0 | 6.9 |
| N | 6.5 | 6.2 |

E. *Preparation of N-β,β-difluoroethyl-N-β,γ-difluoropropylaniline*

31.3 grams of N-β,β-difluoroethylaniline and 20.2 grams of NaHCO3 were placed in a 3-necked flask equipped with a thermometer and stirrer and heated to 130° C.–135° C. with stirring. 26.4 grams of glycerol chlorohydrin were then added dropwise and the reaction mixture was heated to 140° C.–145° C. for 5–6 hours. Upon cooling, the reaction mixture was mixed with water (to remove NaCl, unreacted glycerol chlorohydrin, etc.) and the water layer was separated from the layer containing the desired product. This latter layer was then heated under reduced pressure (3 mm.) to 110° C. to remove unreacted materials. The residue (17.5 grams) consisted essentially of N-β,β-difluoroethyl - N - β,γ - difluoropropylaniline melting at 46° C.–53° C.

F. *Preparation of m-ethyl-N-β,β-difluoroethyl-N-β,γ-dihydroxypropylaniline*

9.2 grams of N - β,β - difluoroethyl - m - ethylaniline, 6.5 grams of glycerol chlorohydrin and 5 grams of NaHCO₃ were placed in a 3-necked flask equipped with a thermometer, stirrer and reflux condenser and heated, with stirring, for 5 hours at 150° C.–155° C. in an oil bath. A vigorous reaction began at 145° C. giving off $CO_2$ and $H_2O$. Upon completion of the reaction, the reaction mixture was cooled and water was added to dissolve NaCl, unreacted glycerol chlorohydrin, etc. The reaction mixture was then filtered to remove any insoluble material and following this benzene was added to the filtrate. A water layer and a benzene layer formed and these two layers were separated from one another by means of a separatory funnel. The benzene layer was washed twice with water and then the benzene was removed from the benzene layer by distilling it under reduced pressure. The viscous brown material remaining after removal of the benzene was heated in an oil bath to 130° C. at 1 mm. pressure. 3 grams of low boiling material were removed. The viscous brown material remaining in the flask and consisting essentially of m-ethyl-N-β,β-difluoroethyl-N-β,γ-dihydroxypropylaniline was bottled without further distilling.

G. Preparation of N-β,β-difluoropropyl-N-β-hydroxyethylaniline 17 grams of N-β,β-difluoropropylaniline, 5.2 grams of ethylene oxide and 5 cc. of ethyl alcohol were sealed in a glass tube and heated in a shaking autoclave for 95 hours at 190° C. The reaction mixture was then cooled, removed from the tube and distilled under reduced pressure (6 mm.) 18 grams of N-β,β-difluoropropyl-N-β-hydroxyethylaniline boiling at 145° C.–148° C./6 mm. were obtained.

H. Preparation of m-methyl-N-γ,γ-difluoropropyl-N-β-hydroxyethylaniline 20.4 grams of m-methyl-N-γ,γ-difluoropropylaniline, 5.81 grams of ethylene oxide and about 5 cc. of ethyl alcohol were sealed in a glass tube and heated in a shaking autoclave for 15 hours at about 210° C. The reaction mixture was then cooled and removed from the tube and the alcohol removed by heating at atmospheric pressure. Then the pressure was reduced to about 1 mm. 16.5 grams of a fraction boiling between 40° C.–130° C./1 mm. were first collected and then 11 grams of a fraction boiling at 130° C./1 mm. were collected. This latter fraction consisted of m-methyl-N-γ,γ-difluoropropyl-N-β-hydroxyethylaniline, the desired product.

Compounds having the formula:

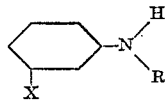

can be prepared by reacting a suitable fluoroalkyl halide with a compound having the formula:

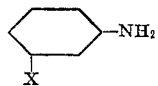

in the presence of an acid binding agent. R and X in the above formulas have the meaning previously assigned to them. Acid binding agents that can be used, include, for example, sodium carbonate, potassium carbonate, sodium bicarbonate and potassium bicarbonate.

I. Preparation of N-β,β-difluoroethylaniline 72.5 grams of 1,1-difluoro-2-bromoethane, 46.5 grams of aniline, 42 grams of sodium bicarbonate and 1 gram of sodium iodide were heated with shaking in an autoclave for 15 hours at 150° C. The reaction mixture was cooled to room temperature, removed from the autoclave by washing with benzene (200 grams) and water, and the resulting mixture was filtered to remove a small amount of insoluble material. The benzene layer was separated from the water layer, washed with water and then distilled to remove the benzene and any remaining water. Upon distilling the residue through a 12″ indented column (Claisen) under a reduced pressure of about 19 mm. 66 grams (84% of theory) of N-β,β-difluoroethylaniline boiling at 104° C.–106° C./19 mm. were obtained.

J. Preparation of m-chloro-N-β,β-difluoroethylaniline 72.5 grams of 1,1-difluoro-2-bromoethane, 68.8 grams of m-chloroaniline, 42 grams of sodium bicarbonate and 1 gram of sodium iodide were heated in a shaking autoclave for 20 hours at about 155° C. The reaction mixture was cooled to room temperature, removed from the autoclave by washing with benzene (200 grams) and water and the resulting mixture was filtered to remove a small amount of insoluble material. The benzene layer was separated from the water layer and then distilled to remove the benzene and any remaining water. Upon distilling the residue through a 12″ indented column (Claisen) under a reduced pressure of about 16 mm., 81.5 grams (85% of theory) of m-chloro-N-β,β-difluoroethylaniline boiling at 129° C.–133° C./16 mm. were obtained.

By the use of 55.5 grams of m-fluoroaniline in place of m-chloroaniline of the foregoing example, about 74 grams (84% of theory) of m-fluoro-N-β,β-difluoroethylaniline boiling at 118° C.–119° C./7 mm. are obtained.

K. Preparation of m-ethyl-N-β,β-difluoroethylaniline 24 grams of m-ethylaniline, 32 grams of 1,1-difluoro-2-bromoethane, 19 grams of NaHCO₃, 50 cc. of toluene and 1 gram of sodium iodide were heated in a shaking autoclave for 15 hours at 190° C.–200° C. Upon cooling, the reaction mixture was filtered and the material (mostly NaBr) collected on the filter was washed with hot toluene. The filtrate from both filtrations was heated to remove the toluene and the residue remaining was distilled under a reduced pressure of about 7 mm. to obtain 21 grams of m-ethyl-N-β,β-difluoroethylaniline boiling at 103° C.–108° C./7 mm.

L. Preparation of m-methyl-N-γ,γ-difluoropropylaniline 52.5 grams of 1,1-difluoro-3-bromopropane ($CHF_2CH_2CH_2Br$), 32.1 grams of m-toluidine and 27.7 grams of sodium bicarbonate were heated together in a suitable reaction vessel for 12 to 13 hours on a steam bath with stirring. Then the reaction mixture was cooled and 48 grams of a viscous liquid were recovered by decantation. The residue (principally NaBr) was washed with benzene and filtered. The viscous liquid and the benzene extract of the NaBr were combined and distilled to remove benzene. Then the residue remaining was fractionated under a reduced pressure of 27 mm. 33 grams of m-methyl-N-γ,γ-difluoropropylaniline which boils at 146° C.–147° C./27 mm. were obtained.

M. Preparation of m-methyl-N-β,β-difluoroethylaniline 160 grams of m-toluidine, 218 grams of 1,1-difluoro-2-bromoethane, 126 grams of NaHCO$_3$ and 3 grams of sodium iodide were heated, with shaking, in an autoclave for 15 hours at 170° C.–175° C. Upon cooling, the reaction mixture was washed out of the autoclave with toluene and water and then filtered to remove any insoluble material present. The oil layer was separated from the water layer and after washing with water the oil layer was heated to remove the toluene and any water remaining therein. The residue was then distilled under a reduced pressure of 7 mm. to obtain 195 grams (76% yield) of m-methyl-N-β,β-difluoroethylaniline which distilled over at 95° C.–99° C./7 mm.

N. Preparation of N-β,β,β-trifluoroethylaniline 40 grams of 1,1,1-trifluoro-2-chloroethane and 64.6 grams of aniline were placed in a Carius tube cooled in an acetone-Dry Ice bath. The sealed tube was placed in a shaking autoclave and heated at 250° C.–225° C. for 30 hours. Upon cooling, the tube was opened and the contents poured into a mixture of 420 cc. of water and 80 grams of hydrochloric acid (sp. gr. 1.18). The dilute acid completely dissolves the aniline, while the N-β,β,β-trifluoroethylaniline formed by the reaction and the reaction by-product diphenylamine are insoluble. The reaction mixture was extracted with two 50 gram portions of benzene. The two benzene extracts were combined, washed free of acid and then distilled. On distillation under a reduced pressure of 15 mm., 24.1 grams (40.6% of theory) of N-β,β,β-trifluoroethylaniline boiling at 84° C.–85° C./15 mm. and having a refractive index of N$_D^{20}$ 1.4820 was obtained.

O. Preparation of N-β,β,β-trifluoroethyl-N-β-hydroxyethylaniline 13.5 grams of N-β,β,β-trifluoroethylaniline and 4.84 grams of ethylene oxide dissolved in 10 cc. of ethyl alcohol were placed in a Carius tube. The sealed tube was shaken in an autoclave for 20 hours at 210° C.–220° C. Upon cooling, the tube was opened and the contents removed therefrom. Upon distillation under a reduced pressure of 15 mm., 16 grams of N-β,β,β-trifluoroethyl-N-β-hydroxyethylaniline boiling at 102° C.–103° C./15 mm. were obtained.

Similarly, the following compounds, for example, are obtained.

| Compound | Boiling Point |
|---|---|
| 1. m-chloro-N-β,β,β-trifluoroethyl-N-β-hydroxyethylaniline. | 165° C.–170° C./1 mm. |
| 2. m-fluoro-N-β,β,β-trifluoroethyl-N-β-hydroxyethylaniline. | 102° C.–105° C./2 mm. |
| 3. m-methyl-N-β,β,β-trifluoroethyl-N-β-hydroxyethylaniline. | 103° C.–104° C./2 mm. |

P. Preparation of N-β,β-difluoropropylaniline 28 grams of aniline, 48 grams of 2,2-difluoro-1-bromo-n-propane (BrCH$_2$CF$_2$CH$_3$), 25 grams of NaHCO$_3$ and 1 gram of sodium iodide were placed in an autoclave and heated, with shaking, for 15 hours at 155° C. and for 10 hours at 170° C. Upon cooling, the reaction mixture was washed out of the autoclave with toluene and water and then filtered to remove insoluble material. The toluene layer was separated from the water layer, washed with water and the toluene removed by heating. The residue remaining was then distilled under reduced pressure (about 12 mm. to 15 mm.). Several fractions were collected as shown hereinafter:

| Fraction | Boiling Point |
|---|---|
| 1 | 70° C.–85° C./15 mm. |
| 2 | 85° C.–97° C./13 mm. |
| 3 | 97° C.–103° C./12 mm. |
| 4 | 103° C.–107° C./12 mm. (9 grams). |

Residue 3 grams.

Fraction 4 was essentially N-β,β-difluoropropylaniline. An analysis of the product is given hereinafter:

|  | Calculated | Found |
|---|---|---|
|  | Per Cent | Per Cent |
| C | 63.1 | 63.8 |
| H | 6.4 | 6.4 |
| N | 8.2 | 8.2 |

Any of the other coupling compounds used in the preparation of the azo compounds of my invention can be prepared by means of the procedures just described.

Although 4-nitro-2,6-di-(trifluoromethyl)-aniline is a known compound, its preparation from the known compound 2,6-di-(trifluoromethyl)-chlorobenzene is described hereinafter.

Q. Preparation of 4-nitro-2,6-di-(trifluoromethyl)-chlorobenzene 50.5 grams of 2,6-di-(trifluoromethyl)-chlorobenzene were added with stirring to a mixture of 70 grams of 100% sulfuric acid and 14 grams of fuming sulfuric acid. Then a mixture of 28 grams of 100% sulfuric acid and 19.5 grams of fuming nitric acid (sp. gr. 1.49) were added slowly with stirring while keeping the temperature below 30° C. and the reaction mixture was stirred for 1 hour at room temperature. The reaction mixture was heated to 90° C. and then slowly allowed to cool to 75° C.–80° C. and maintained at this temperature for 1 hour after which it was left to stand overnight at room temperature. Then the reaction mixture was poured over cracked ice and the product recovered by filtration. 40.5 grams of 4-nitro-2,6-di-(trifluoromethyl)-chlorobenzene melting at 35° C.–36° C. were obtained.

R. Preparation of 4-nitro-2,6-di-(trifluoromethyl)-aniline 30 grams of 4-nitro-2,6-di-(trifluoromethyl)-chlorobenzene, 300 grams of absolute ethyl alcohol, 33 grams of ammonia and 0.5 gram of cuprous chloride were placed in an autoclave and heated to 100° C.–105° C. for 7 hours. Upon cooling, the reaction mixture was removed from the autoclave and added to a large volume of water. Thereupon, the 4-nitro-2,6-di-(trifluoromethyl)-aniline formed by the reaction precipitated and was recovered by filtration. The precipitate was extracted with ether and the ether extract obtained was evaporated to dryness to obtain 21 grams of 4-nitro-2,6-di-(trifluoromethyl)-aniline melting at 145° C.–147° C. was obtained as a yellowish solid.

Analysis:

| | Per cent |
|---|---|
| N-calculated | 10.2 |
| N-found | 10.1 |

On recrystallization from ethyl alcohol, the product was much lighter in color and melted at 147° C.–149° C.

The azo dye compounds of my invention can be applied to the textile materials indicated hereinbefore in the form of an aqueous dispersion and are ordinarily so applied. To illustrate, the dye compound is finely ground with a dispersing agent such as Turkey red oil, sulfite cellulose solution, soap, or an oleyl glyceryl sulfate and the resulting paste is dispersed in water. The dye bath thus prepared is heated to a temperature approximating 45° C.–55° C. and the textile material to be dyed is immersed in the dyebath, following which the temperature is gradually raised to 80° C.–90° C. and maintained at this point until dyeing is complete, usually one half hour to two hours. Upon completion of the dyeing operation the textile material is removed from the dyebath, washed with soap, rinsed well with water and dried.

Widely varying amounts of dye can be used in the dyeing operation. The amount of dye used can be, for example, ⅓ to 3% (by weight) of that of the textile material although lesser or greater amounts of dye can be employed.

1,1-difluoro-3-bromopropane (CHF₂CH₂CH₂Br)

appears to be a new compound. It was prepared as described hereinafter.

S. *Preparation of 1,1-difluoro-3-bromopropane*

98 grams of 1,1,3-tribromopropane were placed in a 200 cc. round bottomed flask fitted with a still-head and a well-cooled receiving flask. 107 grams of dry mercuric fluoride were then added and the reaction flask was gently heated with a free flame until reaction began. The reaction was then allowed to proceed briskly but not too vigorously (by cooling in a bath of ice water or heating, as required) until all the reaction product had distilled over at about 85° C.–100° C. The crude product was then steam-distilled, dried and fractionated. The main product was 1,1-difluoro-3-bromopropane, boiling point 92° C.–94° C. Using this procedure yields of 35–40% of pure 1,1-difluoro-3-bromopropane are obtained. A small amount of CH₂FCH₂CH₂Br was present in the residue.

1,1,3-tribromopropane (CHBr₂CH₂CH₂Br) likewise appears to be a new compound. It was prepared as described hereinafter.

T. *Preparation of 1,1,3-tribromopropane*

1000 grams of bromoform and 30 grams of benzoyl peroxide were placed in a 1100 cc. shaking autoclave and ethylene was passed into the autoclave until a pressure of 700 lbs. per sq. inch was reached. The reaction mixture was then heated at 85° C. for 15 hours following which it was cooled, removed from the autoclave and fractionated under reduced pressure. About 600 grams of 1,1,3-tribromopropane boiling at 105° C.–107° C./30 mm. were obtained. Using the procedure just described or generally similar procedures somewhat higher and somewhat lower yields were obtained. As high as 700 grams have been obtained. Also 100–150 grams of bromoform, 20–30 grams of a low boiling liquid and varying amounts of higher boiling compounds are recovered.

The present application is a continuation-in-part of my prior applications Serial Nos. 631,468 and 631,469, filed November 28, 1945, now U. S. Patents 2,516,302 and 2,516,303, respectively, issued July 25, 1950.

I claim:
1. The azo dye compounds having the formula:

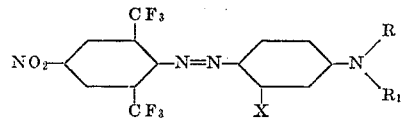

wherein R represents a member selected from the group consisting of a —CH₂CHF₂ group, a —CH₂CF₃ group, a —CH₂CH₂CHF₂ group and a —CH₂CF₂CH₃ group, R₁ represents a member selected from the group consisting of a β-hydroxyethyl group, a γ-hydroxypropyl group and a β,γ-dihydroxypropyl group and X represents a member selected from the group consisting of a hydrogen atom, a halogen atom having an atomic weight of from 19 to 80 and an alkyl hydrocarbon group having 1 to 2 carbon atoms 2. The azo dye compounds having the formula:

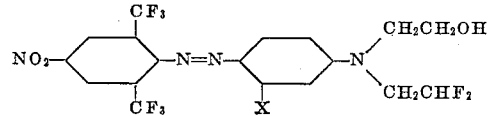

wherein X represents a halogen atom having an atomic weight of from 19 to 80.

3. The azo dye compounds having the formula:

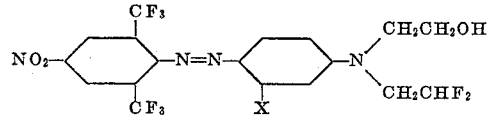

wherein X represents an alkyl hydrocarbon group having 1 to 2 carbon atoms.

4. The azo dye compounds having the formula:

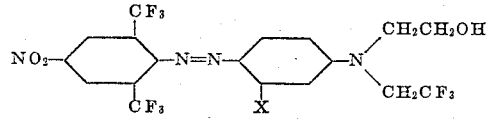

wherein X represents an alkyl hydrocarbon group having 1 to 2 carbon atoms.

5. The azo dye compound having the formula:

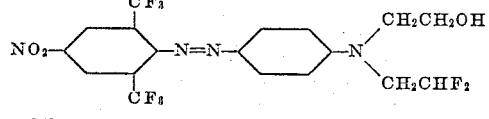

6. The azo dye compound having the formula:

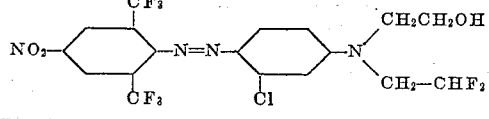

7. The azo dye compound having the formula:

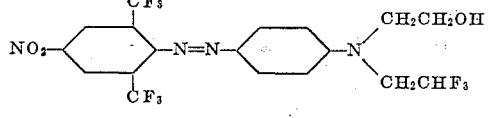

JOSEPH B. DICKEY.

REFERENCES CITED

The following references are of record in the file of this patent:

UNITED STATES PATENTS

| Number | Name | Date |
|---|---|---|
| 1,999,185 | Engelmann | Apr. 30, 1935 |
| 2,194,927 | Daudt | Mar. 26, 1940 |
| 2,432,393 | Dickey et al. | Dec. 9, 1947 |
| 2,516,302 | Dickey | July 25, 1950 |
| 2,516,303 | Dickey | July 25, 1950 |